H. HERTZ.
WINDING FOR ROTATING FIELDS.
APPLICATION FILED JAN. 2, 1906.

908,098.

Patented Dec. 29, 1908.

2 SHEETS—SHEET 1.

Witnesses:

Inventor
Hjalmar Hertz
By Barton Towne
Attys.

H. HERTZ.
WINDING FOR ROTATING FIELDS.
APPLICATION FILED JAN. 2, 1906.
908,098.
Patented Dec. 29, 1908.
2 SHEETS—SHEET 2.
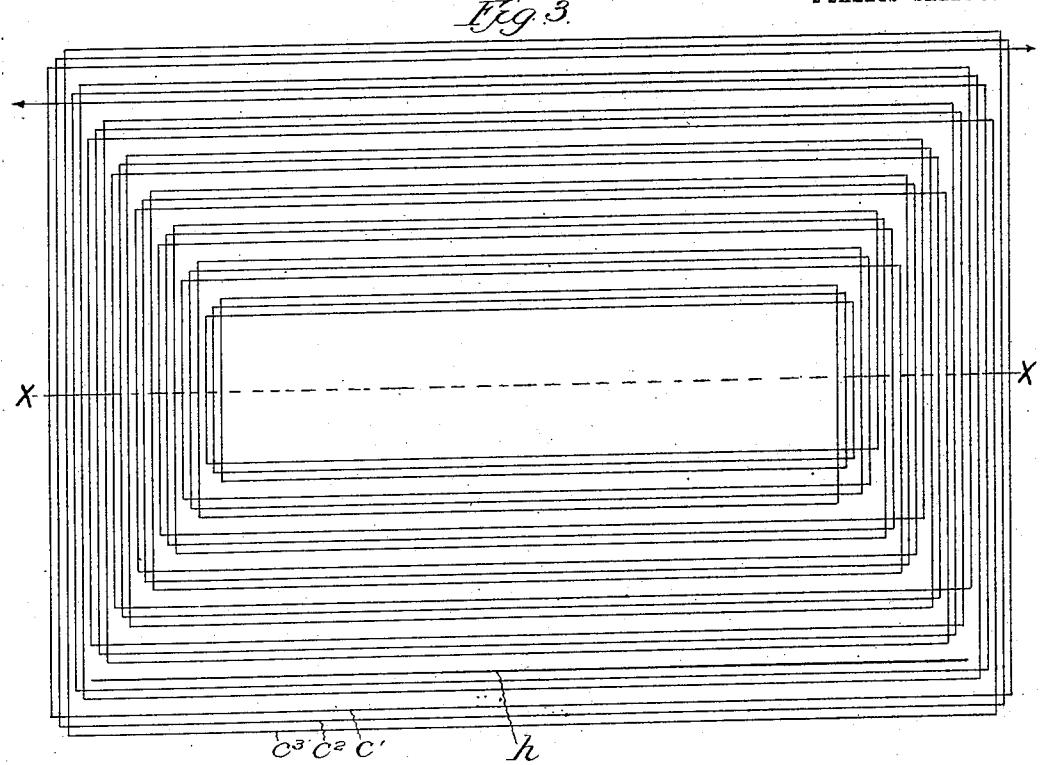
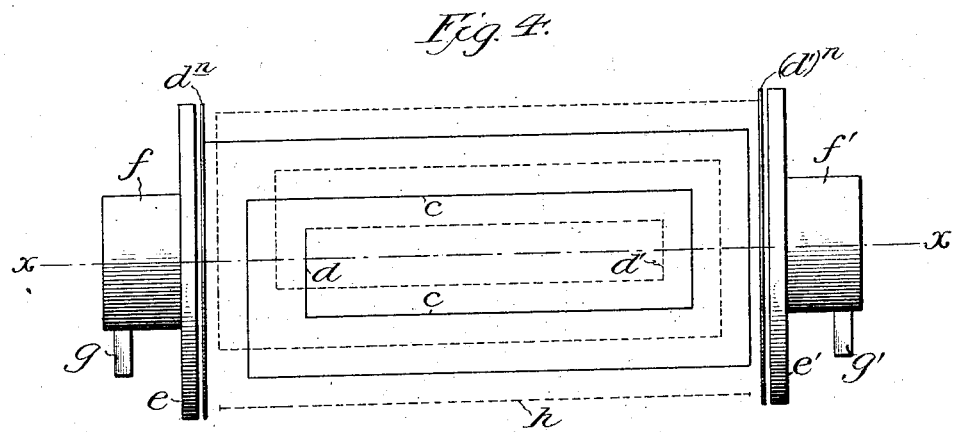
Witnesses:
Inventor:
Hjalmar Hertz
By Barton Tanner
Attys.

UNITED STATES PATENT OFFICE.

HJALMAR HERTZ, OF CHICAGO, ILLINOIS, ASSIGNOR TO WESTERN ELECTRIC COMPANY, OF CHICAGO, ILLINOIS, A CORPORATION OF ILLINOIS.

WINDING FOR ROTATING FIELDS.

No. 908,098.

Specification of Letters Patent.

Patented Dec. 29, 1908.

Application filed January 2, 1906. Serial No. 294,046.

*To all whom it may concern:*

Be it known that I, HJALMAR HERTZ, a citizen of the United States, residing at Chicago, in the county of Cook and State of Illinois, have invented a certain new and useful Improvement in Windings for Rotating Fields, of which the following is a full, clear, concise, and exact description.

My invention relates to a rotor for dynamo-electric machines, and is applicable more particularly to the rotating field magnets of alternating current generators of the high speed type. In the case of generators of this type, which are intended to be direct-driven by steam turbines, the very high speed of rotation imposes strict limits in the size of the rotor, and further makes it essential to have the rotor as nearly symmetrical and mechanically balanced with respect to its axis of rotation as possible. The enormous centrifugal force which is exerted gives rise to the further requirement that the winding of the rotor shall be composed of parts which are comparatively large and substantial, so as to permit of their being effectively secured in place. For these reasons it is convenient to construct a rotor with an iron core and heavy bar conductors embedded in longitudinal slots in the periphery of the core, the end connections between the several conductors being formed by disks assembled upon the shaft at the ends of the core, the disks being insulated from each other and from all the conductors except those to which they are immediately connected. Such a construction is described in an application of Charles H. Smoot, Serial No. 294,044 filed January 2, 1906.

The object of the present invention is to provide a scheme for winding a rotor having the mechanical construction above referred to, in such manner that the parts may be easily assembled, that the terminal conductors of the winding may be led out at opposite ends of the rotor, and that the completed structure shall be symmetrical and mechanically balanced with respect to its axis of rotation.

I will describe my improved scheme of winding in accordance with the accompanying drawing, in which—

Figure 1:
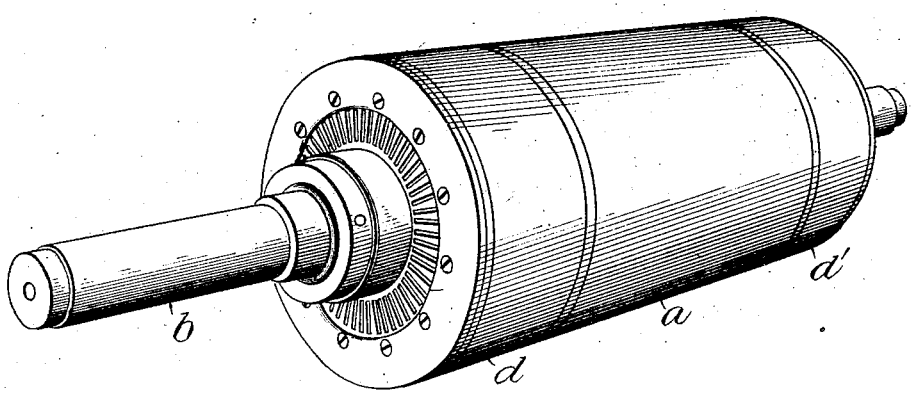
Figure 2:
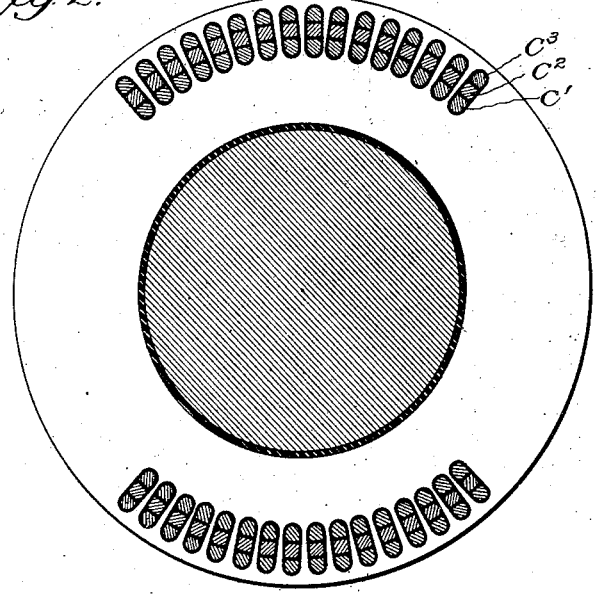

Figure 1 is a perspective view of a rotating field magnet for a dynamo electric generator of the type to which my improved scheme of winding is especially intended to be applied; Fig. 2 is a cross sectional view thereof; Fig. 3 is a diagram illustrating the scheme of winding, the portion of the circumference of the rotor indicated being considered as developed into a plane; Fig. 4 is a simplified diagram illustrating the theory of winding, considering only a few turns, and only one conductor in each slot of the core.

As shown in Figs. 1 and 2, the armature consists of a core $a$ composed of laminated sheet iron disks assembled upon a shaft $b$, said core having a series of longitudinal holes or slots near its periphery, in which the conductor bars $c$ of the winding are intended to be embedded. In the form of rotor shown there are three conductors, $c'$, $c^2$, $c^3$, in each slot, said conductors being radially superposed. The several conductors are all connected in series by connector disks $d$, $d'$, at the ends of the rotor, said conductors and disks being suitably insulated, and forming a series winding to produce magnetic poles on diametrically opposite sides of the rotor. The rotary field magnet shown is of the bipolar type, but it will be evident that my invention is capable of application to magnets of the multipolar type.

In accordance with my invention, the winding is so arranged that the terminals thereof will be brought out at opposite ends of the rotor, so that end clamping disks may be applied upon which contact brushes may bear to convey current to and from the winding. To obtain this result, while at the same time maintaining a mechanically balanced structure, I have devised the scheme of winding shown diagrammatically in Figs. 3 and 4. The scheme can perhaps be best understood by considering the winding as made up of two sets of convolutions united at the middle part of the rotor, and proceeding outwardly in opposite directions until the terminal disks at the opposite ends of the rotor are reached, the winding, however, being unidirectional with respect to the flow of current from one terminal to the other. In assembling the winding, the conductors and connector disks forming the middle portion of the winding are placed first on the field magnet core, and the winding is then built up progressively from the middle portion toward each end thereof, thus naturally bringing the terminal conductors and end plates on the outside of the magnet. Another way of considering the winding is that it starts with one end disk and gradually winds inward until the core is reached, after which it continues to wind in the same direction from the field core outward until it terminates in a disk at the opposite end of the rotor from the starting point, having made the number of turns and groups of turns both ways. The inward and outward going groups of turns are combined alternately with respect to the circumference of the rotor.

Referring to Fig. 4, the scheme of winding will be readily understood. It will be seen that the winding is composed of two sets of convolutions, one set being indicated in full lines, and the other set being indicated in dotted lines, the two sets being united at the middle portion of the winding. The axis of the winding is indicated by the dotted lines $x—x$. It will be understood that in a bipolar machine this dotted line will correspond with the axis of rotation of the rotor, but this statement would not of course be true with respect to a multipolar magnet. Still referring to Fig. 4, the horizontal lines $c$ in the diagram of the winding indicate conductor bars, while the vertical lines $d, d'$, indicate end connectors for said conductor bars, such, for example, as the disks illustrated at the ends of the rotor shown in Fig. 1. Considering now the innermost connector disks $d, d'$, of the two groups at the ends of the rotor, these are connected by a conductor bar which forms the middle length, so to speak, of the winding, and the two innermost disks, $d$ and $d'$, may be taken as the starting points for the sets of convolutions shown respectively in full lines and dotted lines. It will be noted that these sets of convolutions proceed outwardly in opposite directions, and finally terminate in outermost disks $d^n$ and $(d')^n$ at the ends of the rotor. Clamping disks or plates, $e, e'$, are assembled upon the shaft of the rotor outside the terminal disks $d^n$ and $(d')^n$, and make contact respectively with said terminal disks, said end plates, $e$ and $e'$, having surfaces, $f, f'$, upon which collecting brushes, $g, g'$, are adapted to bear to convey current to and from the winding.

Referring to Fig. 4, it will be seen that as the sets of convolutions, beginning at disks $d$ and $d'$, and indicated in full and dotted lines, respectively, proceed outwardly, each longitudinal conductor of each set is extended to a connector disk which lies outside the intervening connector disk belonging to a neighboring conductor of the opposite set. It will be further noted that such connections to the connector disks are made alternately on different sides of the axis of winding, and that when a dotted conductor is extended below the axis $x—x$ to its connector disk, the corresponding conductor shown in full lines is extended above the axis $x—x$ to its disk, and vice versa.

It will further be noted that the scheme of winding shown in Fig. 4, in order to bring the terminals at opposite ends of the rotor, involves a greater number of longitudinal conductors or lengths at one side of the axis than on the other; and in the actual construction of a rotor according to this plan, I preferably provide a dummy conductor on that side of the axis of the winding which otherwise would have the fewest number of lengths of the actual winding, this dummy conductor therefore serving to balance the weight of the conductors on the opposite sides of the axis of the winding. The diagrammatic winding illustrated in Fig. 4 shows the arrangement if there were only one conductor in each slot of the core. Where there are several turns of the winding, so to speak, in each slot, the same general scheme will be followed, but there will naturally be somewhat more complication in the relative arrangement of the connector disks.

Referring to Fig. 3, the diagram illustrates a winding in which there are three conductors in each slot of the core, these conductors being radially superposed. In the diagram the line $x—x$ indicates the axis of the winding; the horizontal lines indicating the longitudinal conductors embedded in slots in the core, and the vertical lines indicating the connector disks at the ends of the rotor. There being three conductors in each slot, the horizontal lines are indicated in groups of three conductors each, and as these conductors in the actual machine are radially superposed, the relative arrangement of these conductors is indicated by their position with respect to each other that one of any group of three conductors which is nearest the axis $x—x$ in the diagram indicates the radial innermost conductor of the slot. Similarly, that one of any group of three conductors which is farthest from the axis line $x—x$ indicates the conductor which is radially outermost in the slot.

It will be seen that preferably the radially innermost conductor in each slot is the longest, that is, it is extended to a connector disk which lies outside the connector disks of the uppermost conductors. This is for the purpose of greater convenience in assembly, and also makes possible a stronger construction of the rotor to withstand centrifugal force. Such a relative arrangement of the conductors in the slot is described in the application of Charles H. Smoot, before referred to.

Considering the winding shown diagrammatically in Fig. 3, therefore, it will be seen that it is composed of two sets of convolutions beginning with a conductor uniting the innermost connector disks $d$ and $d'$ at the ends of the rotor, and proceeding outwardly in opposite directions, being finally terminated in the outer or end disks $(d^n$ and $d')^n$ at the opposite ends of the rotor. Each set of convolutions has its conductors or turns arranged in groups of three, there being one group for each slot in the core, and these groups belonging to the two different sets of convolutions, are disposed in alternations upon the circumference of the core.

It will further be seen that each group of convolutions ends in a conductor which is extended to a connector disk lying outside the neighboring group of conductors of the other set, said terminal conductor being insulated from such intervening disks through which it passes. It will further be seen that such extensions from the successive groups of convolutions are located alternately on opposite sides of the axis of the winding so that said winding is made symmetrical, and is mechanically balanced.

Like the simplified winding shown in Fig. 4, there will necessarily be one more horizontal conductor on one side of the axis of the winding than on the other, due to the fact that the terminals are brought out at opposite ends of the rotor, and in the form of winding shown in Fig. 3, I also provide a dummy conductor $h$ on that side of the axis which has the fewer number of lengths of the actual winding.

Having thus described my invention, I claim:

1. A rotor for dynamo electric machines consisting of a core, conductors extending longitudinally of the core and end connectors uniting said conductors in series to form a winding, said winding starting at the outer one of the connectors at one end of the core and proceeding inward to the inner connectors nearest the core, and then continuing outward by way of connectors which are disposed intermediate the connectors of the first portion, finally terminating in the outer connector at the opposite end of the armature from the starting point.

2. A rotor for dynamo electric machines comprising a core, longitudinal conductors and end-connector disks uniting said conductors in series to form a winding, the conductors and disks forming the middle portion of the winding being assembled first upon the body of the core and the winding built up progressively from such middle portion toward each end thereof, whereby the terminals of the winding are led out at opposite ends of the rotor, while the entire structure is symmetrical and mechanically balanced.

3. A rotor for dynamo electric machines, comprising a core, a group of transverse insulated disks at the ends of said core, a conductor uniting the innermost disks of the two groups, and additional similar conductors connected in series with said first mentioned conductor by the outer disks to form a unidirectional winding for said core in two sets of convolutions, beginning with said two innermost disks, proceeding in opposite directions and terminating respectively in the outermost disks of the two groups.

4. A rotor for dynamo electric machines, comprising a core, a group of transverse insulated disks at the ends of said core, a conductor uniting the innermost disks of the two groups, and additional similar conductors connected in series with said first mentioned conductor by the outer disks to form a unidirectional winding for said core in the two sets of convolutions, beginning with said two innermost disks, proceeding in opposite directions and terminating respectively in the outermost disks of the two groups, and a dummy conductor to equalize the weight of conductors on opposite sides of the axis of the winding.

5. A rotor for dynamo electric machines comprising a core and a unidirectional winding comprising longitudinal conductors and end connections, said winding consisting of two sets of convolutions which begin with the innermost end connections and proceed outwardly, terminating at opposite ends of the rotor, and a dummy conductor on the side of the axis of the winding having the less number of conductors, to equalize the weight of the conductors.

6. A rotor for dynamo electric machines comprising a core, conductors extending longitudinally thereof, and insulated connector disks at the ends of said core uniting said conductors to form a unidirectional winding, said winding being composed of two sets of convolutions beginning with a conductor uniting the innermost connector disks of the groups at the respective ends of said core, proceeding outwardly in opposite directions and terminating in the outer or end disks of the respective groups, the two sets of convolutions having their conductors arranged in groups which are disposed alternately in succession around the circumference of the core.

7. A rotor for dynamo electric machines comprising a core, conductors extending longitudinally thereof, and insulated connector disks at the ends of said core uniting said conductors to form a unidirectional winding, said winding being composed of two sets of convolutions beginning with a conductor uniting the innermost connector disks of the groups at the respective ends of said core, proceeding outwardly in opposite directions and terminating in the outer or end disks of the respective groups, the two sets of convolutions having their conductors arranged in groups which are disposed alternately in succession around the circumference of the core, each group of convolutions ending in a conductor which is extended to a connector disk lying outside the intervening disks of the neighboring group of conductors of the other set, said terminal conductor being insulated from such intervening disks through which it passes.

8. A rotor for dynamo electric machines comprising a core, conductors extending longitudinally thereof, and insulated connector disks at the ends of said core uniting said conductors to form a unidirectional winding, said winding being composed of two sets of convolutions beginning with a conductor uniting the innermost connector disks of the groups at the respective ends of said core, proceeding outwardly in opposite directions and terminating in the outer or end disks of the respective groups, the two sets of convolutions having their conductors arranged in groups which are disposed alternately in succession around the circumference of the core, each group of convolutions ending in a conductor which is extended to a connector disk lying outside the intervening disks of the neighboring group of conductors of the other set, said terminal conductor being insulated from such intervening disks through which it passes, such extensions from the successive groups of convolutions being located on opposite sides of the axis of the winding, whereby said winding is symmetrical and mechanically balanced.

In witness whereof, I hereunto subscribe my name this 29 day of Dec. A. D., 1905.

HJALMAR HERTZ.

Witnesses:
 ALFRED H. MOORE,
 G. E. FOLK.